(12) United States Patent
Cauchie et al.

(10) Patent No.: US 11,708,115 B2
(45) Date of Patent: Jul. 25, 2023

(54) DEVICE FOR REINFORCING, SEALING OR DAMPING A STRUCTURAL ELEMENT

(71) Applicant: SIKA TECHNOLOGY AG, Baar (CH)

(72) Inventors: Patrick Cauchie, Rebecq (BE); Ardi Shehu, Rotselaar (BE); Michael Meier, Niederrohrdorf (CH); Vincent Belpaire, Uccle (BE); Denis Souvay, Illkirch-Graffenstaden (FR)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/764,502

(22) PCT Filed: Nov. 9, 2018

(86) PCT No.: PCT/EP2018/080780
§ 371 (c)(1),
(2) Date: May 15, 2020

(87) PCT Pub. No.: WO2019/096693
PCT Pub. Date: May 23, 2019

(65) Prior Publication Data
US 2020/0353994 A1 Nov. 12, 2020

(30) Foreign Application Priority Data
Nov. 15, 2017 (EP) .................................... 17201942

(51) Int. Cl.
*B62D 25/00* (2006.01)
*B62D 25/04* (2006.01)
(Continued)

(52) U.S. Cl.
CPC ......... *B62D 25/088* (2013.01); *B62D 29/002* (2013.01); *B62D 25/00* (2013.01); *B62D 25/04* (2013.01); *B62D 29/005* (2013.01)

(58) Field of Classification Search
CPC ...... B62D 25/00; B62D 25/04; B62D 25/088; B62D 29/002; B62D 29/005; B60R 13/0815
(Continued)

(56) References Cited

U.S. PATENT DOCUMENTS

| 5,725,272 A | 3/1998 | Jones |
| 6,263,635 B1 * | 7/2001 | Czaplicki ............. B62D 29/002 52/573.1 |

(Continued)

FOREIGN PATENT DOCUMENTS

| DE | 19858903 A1 * | 6/2000 | ........... B62D 29/002 |
| DE | 10 2007 025 930 A1 | 12/2008 | |

(Continued)

OTHER PUBLICATIONS

Lepesch, "Reinforcing element, especially for hollow support member of body of motor vehicle, comprises tubular support to which is connected expandable mass which retains support in hollow member of body", Jun. 21, 2000, German Patent Office, DE19858903A1 (Year: 2000).*

(Continued)

*Primary Examiner* — Dennis H Pedder
*Assistant Examiner* — Joyce Eileen Hill
(74) *Attorney, Agent, or Firm* — Oliff PLC

(57) ABSTRACT

A device for reinforcing, sealing, or damping a structural element in a motor vehicle including a support which has multiple cells, wherein each cell surrounds a cavity. Each cavity is at least partially delimited by walls in each direction, wherein each cell has an extension in length, height, and width between 5 mm and 100 mm. An outer surface of the support can be connected to the structural element by an adhesive.

17 Claims, 7 Drawing Sheets

(51) Int. Cl.
*B62D 25/08* (2006.01)
*B62D 29/00* (2006.01)

(58) Field of Classification Search
USPC .......................... 296/187.02, 187.06, 193.06
See application file for complete search history.

(56) References Cited

U.S. PATENT DOCUMENTS

| | | | | |
|---|---|---|---|---|
| 6,793,274 | B2* | 9/2004 | Riley | ................... B62D 21/152 |
| | | | | 296/187.03 |
| 7,105,112 | B2* | 9/2006 | Czaplicki | ................ B29C 44/18 |
| | | | | 264/46.5 |
| 7,469,459 | B2* | 12/2008 | Kosai | ...................... B29C 44/18 |
| | | | | 29/455.1 |
| 9,440,678 | B2* | 9/2016 | Kurokawa | ............. B62D 21/15 |
| 2002/0174954 | A1* | 11/2002 | Busseuil | .............. B62D 29/002 |
| | | | | 156/349 |
| 2004/0212220 | A1 | 10/2004 | Riley et al. | |
| 2004/0227377 | A1 | 11/2004 | Gray | |
| 2005/0058787 | A1* | 3/2005 | Ishikawa | .................... C09J 5/08 |
| | | | | 428/34.1 |
| 2009/0085379 | A1 | 4/2009 | Takahashi et al. | |
| 2014/0265443 | A1 | 9/2014 | Meaige et al. | |
| 2015/0360733 | A1* | 12/2015 | Nagwanshi | .......... B62D 29/001 |
| | | | | 180/311 |
| 2016/0194036 | A1 | 7/2016 | Kurokawa | |
| 2018/0029644 | A1* | 2/2018 | Li | ....................... B62D 29/002 |

FOREIGN PATENT DOCUMENTS

| | | | |
|---|---|---|---|
| DE | 10 2008 015 960 A1 | 10/2009 | |
| EP | 2 147 848 A1 | 1/2010 | |
| JP | 2010-036696 A | 2/2010 | |
| WO | 01/58741 A1 | 8/2001 | |
| WO | 02/22387 A1 | 3/2002 | |
| WO | 02/26549 A1 | 4/2002 | |
| WO | 2004/043668 A1 | 5/2004 | |
| WO | 2005/028178 A1 | 3/2005 | |
| WO | 2007/082677 A1 | 7/2007 | |
| WO | 2008/014250 A1 | 1/2008 | |
| WO | WO-2009036784 A1 * | 3/2009 | ............. C08L 53/02 |
| WO | 2010/018190 A1 | 2/2010 | |
| WO | 2010/054194 A1 | 5/2010 | |
| WO | 2012/056349 A1 | 5/2012 | |
| WO | 2014/113544 A1 | 7/2014 | |
| WO | 2015/004271 A2 | 1/2015 | |
| WO | 2015/054836 A1 | 4/2015 | |
| WO | 2015/061291 A1 | 4/2015 | |

OTHER PUBLICATIONS

May 19, 2020 International Preliminary Report on Patentability issued in International Patent Application No. PCT/EP2018/080780.
Feb. 15, 2019 International Search Report issued in International Patent Application No. PCT/EP2018/080780.
S. Balasubramanyam, "Head impact characterization of generic A-pillar of an automobile", Graduate Theses, Dissertations, and Problem Reports, 943 (1999).
Proprietor production products, various dates: 2005, 2007, 2010, and 2017.
Hamza, Karim et al., "Design Optimization of a Vehicle B-Pillar Subjected to Roof Crush Using Mixed Reactive Taboo Search", Proceedings of DETC' 03 ASME Design Engineering Technical Conferences and Computers and Information in Engineering Conference, Jan. 2003.
Glaser, Stefan, "Structural Plastic Inserts in the Car Body," Innovation, pp. 16-18, 2008.
Mohan, Pradeep et al., "Innovative Approach for Improving Roof Crush Resistance", DYNAmore, 2006.
Buback, M.P. et al., "Use of Expandable Epoxy Foams for the Improvement of Structureborne NVH Performance", SAE Technical Paper Series, Apr. 2006.
Body Shop Structural Inserts, Safer Rides; Added Strength Start with Sika; Global Reach But Local Partnership, 2015.
Souvay, Denis, "Car Body Reinforcement with Sika," Galm Birmingham, Apr. 2017.
Jovanovic, D. et al., "Optimizing Bonding and Reinforcing Solutions", Lightweighting World, pp. 51-62, 2016.

* cited by examiner

DEVICE FOR REINFORCING, SEALING OR DAMPING A STRUCTURAL ELEMENT

The present invention relates to a device for reinforcing, sealing or damping a structural element, as well as to a system of a reinforced, sealed or damped structural element in a motor vehicle.

Construction elements such as, for example, bodies and/or chassis frames of transportation and conveyance means, in particular of aquatic or terrestrial vehicles or of aircraft, in many instances have structures having cavities in order for lightweight constructions to be enabled. However, these cavities cause a wide variety of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises, which would otherwise be transmitted along the cavity or through the latter, to be reduced. Many of these cavities have an irregular shape or tight dimensions, on account of which it becomes difficult to properly seal, reinforce, and damp said cavities.

Sealing elements (baffles) are therefore used in particular in the automotive industry but also in the aviation and nautical industry in order for cavities to be sealed and/or to be acoustically closed off, or reinforcing elements (reinforcers) are used in order for cavities to be reinforced.

A body of an automobile is schematically illustrated in FIG. 1. The body 10 herein has various structures having cavities such as, for example, pillars 14 and supports or stays 12, respectively. Such structural elements 12, 14 having cavities are usually sealed or reinforced respectively, using sealing and/or reinforcing elements 16.

FIG. 2 schematically illustrates a known concept for sealing and/or reinforcing such structural elements having cavities in motor vehicles. FIG. 2 herein shows an insulating element 16 in a structural element 12, 14 prior to an expansion of an expandable material 13. In this example, the expandable material 13 is arranged on surfaces of a support element 11 which are arranged in the vicinity of the structural element 12, 14. In this exemplary embodiment, the support element 11 has an M- or W-shaped cross-section. A stiffness of the support element 11 is thereby increased.

The cross-section of this support element 11 or the insulating element 16 according to the prior art is formed such that it can be produced by injection molding in a simple fashion. For this, adjacent faces of the support element 11 are formed with an angle 15 which is slightly larger than 90°. With such a design of cross-section of the support element 11, the injection-molded support element 11 can easily be extracted from the mold of the injection-molding machine.

A surface of the support element 11 which faces a respective inner side of the structural element 12, 14 typically has a checkered form. In this case, the connecting material or the expandable material 13 can in each case be arranged only on surfaces which are arranged in the vicinity of the structural element 12, 14.

The disadvantage of such insulating elements 16 is that the support element 11 cannot be optimally connected to the structural element 12, 14 because there is not enough surface area of the support element 11 available close to the structural element 12, 14 and hence suitable for attachment of connecting material 13.

The invention is therefore based on the object of providing an improved device of the type cited initially which allows the support to be better connected to the structural element. Also, the device should be suitable for use in widely varying applications, such as for example for reinforcing, sealing or damping a structural element.

This object is achieved by a device for reinforcing, sealing or damping a structural element in a motor vehicle, wherein the device comprises: a support with multiple cells, wherein the cells each surround a cavity, wherein each cavity is at least partially delimited by walls in each direction, and wherein each cell has an extension in length, height, and width between 5 mm and 100 mm, wherein an outer surface of the support can be connected to the structural element by an adhesive.

This solution has the advantage that thereby a significantly better connection of the support to the structural element can be achieved. Due to the closed or substantially closed surface of the support element, it is possible to arrange the adhesive superficially on all sides of the support and thus better connect the carrier to the structural element. In this way, substantially better reinforcement of cavities and/or sealing of cavities and/or damping of cavities can be achieved in comparison with devices from the prior art.

A core concept of the invention is that, due to the structure of the support with multiple cells, a mechanically stronger support can be provided which offers a large attachment area for adhesive in order to connect the support to the structural element. By the provision of multiple cells which each surround a cavity, the support can to some extent be constructed in modular fashion. In this way, such a support can be ideally adapted to the respective situation.

The provision of cells of the given order of magnitude offers the advantage that thereby firstly lightweight supports can be constructed, and secondly supports with a high mechanical load-bearing capacity can be produced.

In an exemplary refinement, the cells each have an extension in length, height and width between 10 and 80 mm, preferably between 15 and 70 mm, particularly preferably between 20 and 60 mm.

In an exemplary embodiment, the support has at least four cells. In an exemplary refinement, the support has at least six, preferably at least eight, particularly preferably at least ten cells.

The provision of multiple cells to form the support has the advantage that, in this way, a modular support can be produced which has a high mechanical load-bearing capacity. Here for example internal walls of the cells may function as reinforcing ribs. External walls of the cells which form an outer face of the support however offer an attachment surface for connecting the support to the structural element.

In an exemplary embodiment, the cell walls close at least 70%, preferably at least 80%, particularly preferably at least 90% of the outer surface of the support.

The provision of a closed or substantially closed outer surface of the support offers the advantage that, in this way, as large as possible an area can be provided for attaching the support to the structural element.

In an exemplary embodiment, the cell walls close at least 70%, preferably at least 80%, particularly preferably at least 90% of a cell envelope.

The provision of closed or substantially closed cells offers the advantage that, in this way, as high a mechanical load-bearing capacity as possible can be guaranteed. Here for example, cell walls which form an outer face of the support may be closed to a greater extent than cell walls which lie inside the support.

In an advantageous refinement, the cell walls which lie inside the support are less than 70%, preferably less than 60%, particularly preferably less than 50% closed.

In a further preferred refinement, the cell walls which form an outer face of the support are at least 85%, preferably at least 90%, particularly preferably at least 95% closed.

In an exemplary embodiment, the cells are arranged in only one layer.

In an alternative embodiment, the cells are arranged in two, three, four or five layers.

In an alternative embodiment, the cells are arranged in at least two, at least three, at least four or at least five layers.

In an exemplary embodiment, an arrangement and form of the cells are adapted to a proposed load case for the device.

In an exemplary embodiment, the cells have different dimensions.

In an exemplary embodiment, the cells are irregular in form.

In an exemplary embodiment, a wall thickness of the cells is adapted to a proposed load case for the device.

In an exemplary embodiment, a wall thickness of the cells is between 1 and 8 mm, preferably between 1.5 and 7 mm, particularly preferably between 2 and 6 mm.

In an exemplary embodiment, cell walls arranged inside the support have a greater wall thickness than cell walls which form an outer face of the support.

The provision of cells which are adapted in design to the respective load case has the advantage that, in this way, weight-optimized supports can be provided which have a high mechanical load-bearing capacity relative to their weight.

In an exemplary embodiment, a thickness of the cell walls is uneven.

In an exemplary refinement, a cross-section of the cell walls is concave.

In an alternative refinement, a cross-section of the cell walls tapers in one direction.

In an exemplary embodiment, the cells have openings.

In an exemplary refinement, the openings are round, oval, rectangular, square or irregular in form.

In an exemplary refinement, the cells have at least one opening on at least two walls.

In an exemplary refinement, the openings are arranged in walls which are not adjacent to each other.

The provision of openings in the cell walls has the advantage that, in this way, firstly the cells can be weight-optimized and secondly a through-flow capacity for the dip-coating fluid can be guaranteed.

In an exemplary embodiment, the support contains metal, steel, aluminium, magnesium, plastic, fiber-reinforced plastic (in particular carbon-fiber-reinforced plastic or glass-fiber-reinforced plastic), organic sheet material, or a combination of said materials.

In an exemplary embodiment, all walls of the support are formed from the same material.

The support proposed here may be produced for example in a 3D printing process.

The object cited initially is moreover achieved by a system of a reinforced, sealed or damped structural element in a motor vehicle, the system comprising: a structural element; a support, wherein the support is arranged in the structural element; and an adhesive, wherein the adhesive connects the support and the structural element together.

This support is here formed with the cellular structure described herein.

In an exemplary embodiment, the adhesive has an expansion rate of less than 500%, or the adhesive is a non-expandable adhesive.

Materials which are expandable to a lesser degree, or non-expandable materials, offer the advantage that the adhesive does not lose mechanical stability to an excessive degree on expansion. In principle, a material becomes mechanically weaker the more the material is expanded.

SikaReinforcer®-940 or SikaPower®-497 in particular are examples of adhesives which are non-expandable or expandable to a lesser degree. SikaReinforcer®-940 herein is an example of an expandable material, whereas SikaPower®-497 is an example of a non-expandable material.

In the context of this invention, the term "non-expandable" means that a material does not change its volume by more or less than 10% during the process steps provided for the material. For example, non-expandable adhesives may shrink slightly during curing. Such a change in volume during curing is considered to be "non-expandable" in the context of this application.

In one exemplary embodiment, the adhesive is curable at a temperature of more than 120°.

In an alternative embodiment, the adhesive has an expansion rate of more than 500%, preferably of more than 1000%, particularly preferably of more than 1500%.

An example of such comparatively greatly expandable adhesives is in particular SikaBaffle®-450.

In a further alternative embodiment, the system comprises a first adhesive and a second adhesive, wherein the adhesives have dissimilar properties, in particular in terms of expansion and/or curing and/or a mating capability and/or a mechanical load-bearing capacity.

Details and advantages of the invention will be described below on the basis of exemplary embodiments and with reference to schematic drawings, in which.

Figure 1:
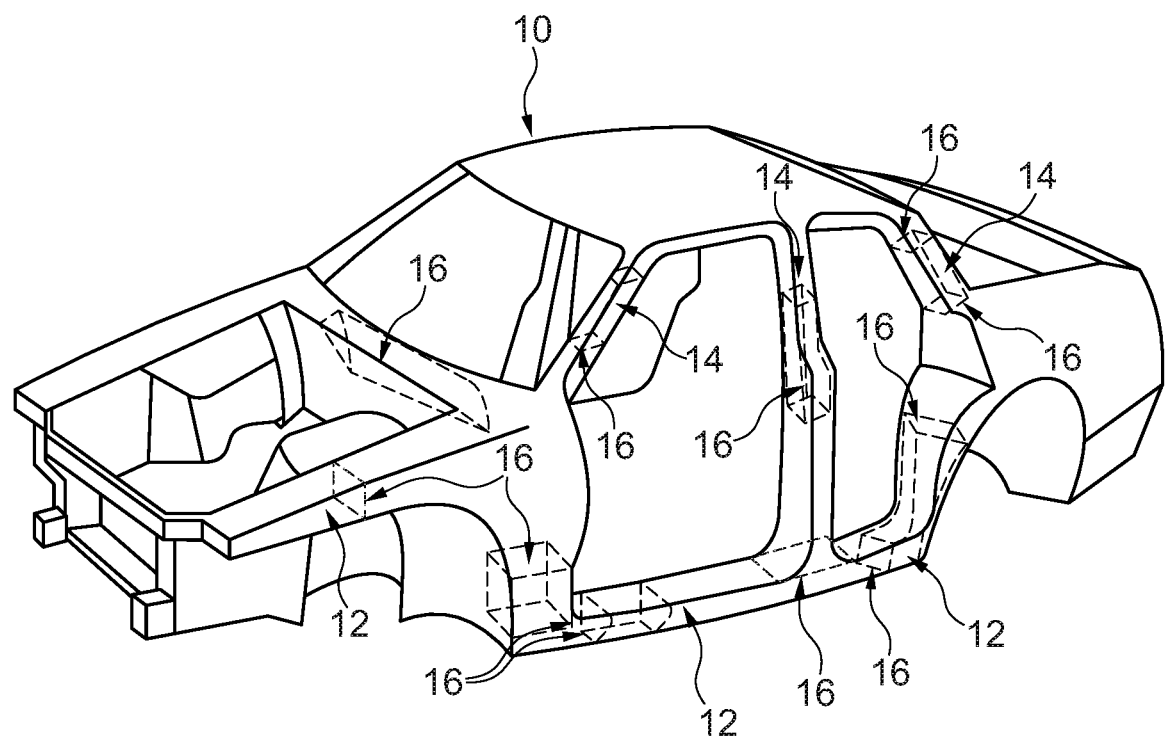
FIG. 1 shows an exemplary illustration of a body.
Figure 2:
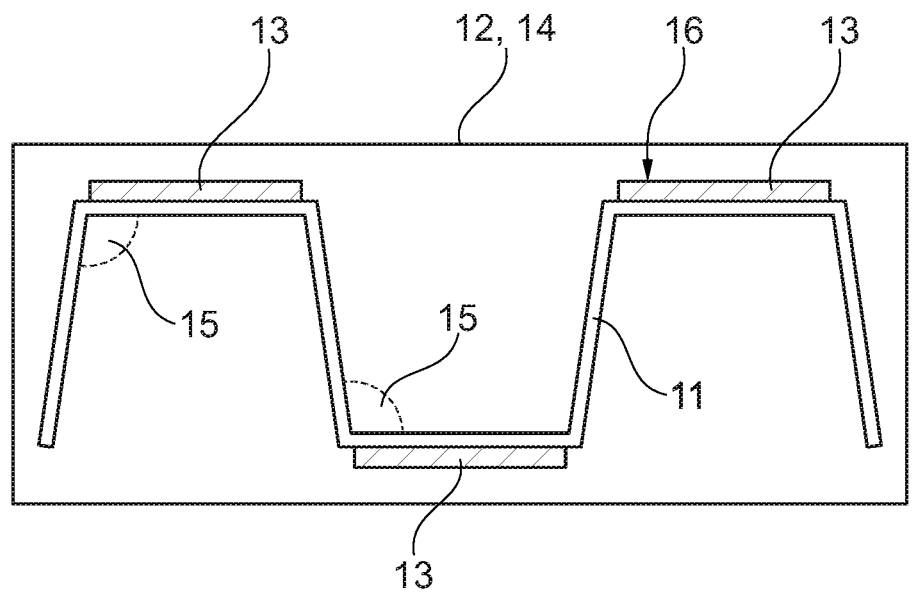
FIG. 2 shows a schematic depiction of an exemplary device according to the prior art.
Figure 3A:
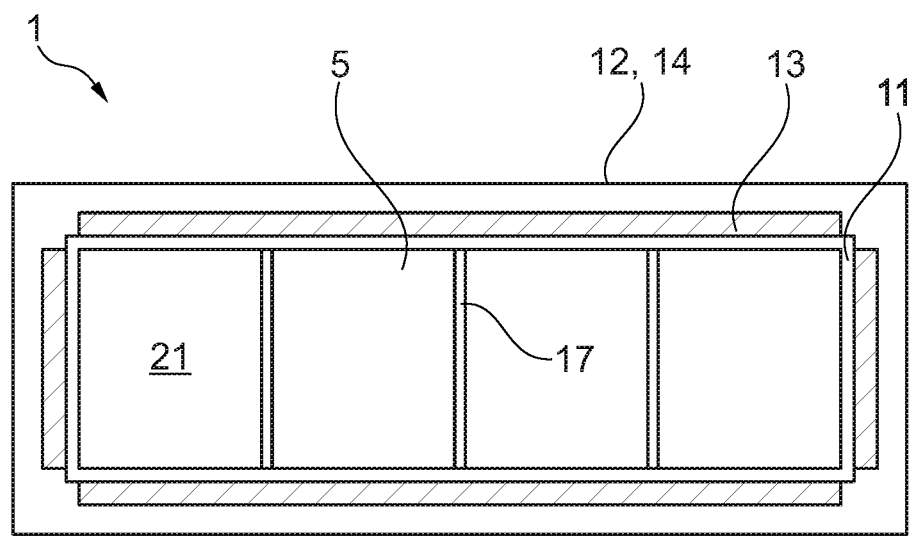
Figure 3B:
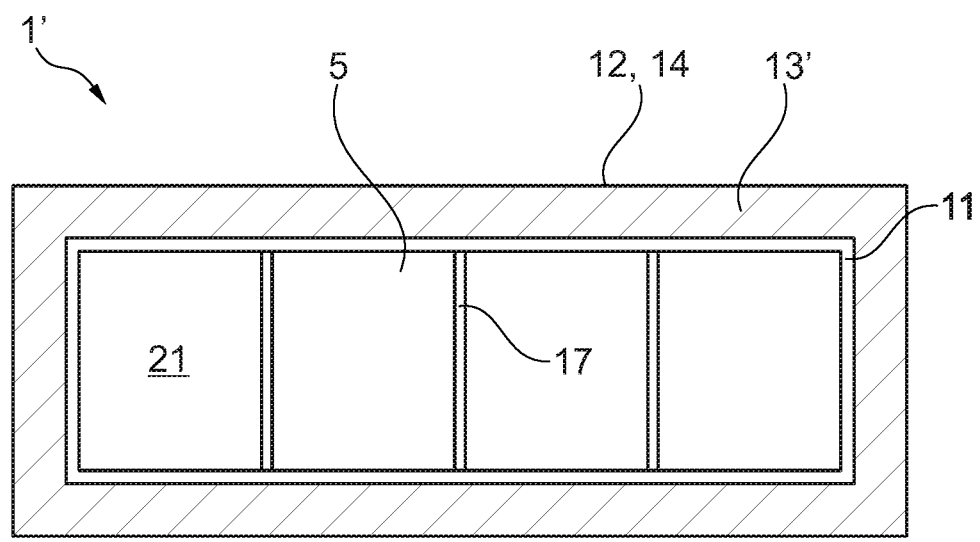

FIGS. 3*a* and 3*b* show a schematic illustration of an exemplary system of a reinforced, sealed or damped structural element; and FIGS. 4*a* to 12 show schematic depictions of exemplary supports.

FIGS. 3*a* and 3*b* show an exemplary system 1 of a reinforced, sealed or damped structural element 12, 14. FIG. 3*a* shows a situation in which the adhesive 13 has not expanded, and FIG. 3*b* shows a situation in which the adhesive 13' has expanded.

In this exemplary system 1, a support 11 with four mutually adjacent cells 5 is shown. Each cell 5 encloses a cavity 21. The adjacent arrangement of the cells 5 means that the inner walls of the cells 5 function as ribs 17. The outer walls of the cells 5 serve as attachment faces for the adhesive 13 for connecting the support 11 to the structural element 12, 14.

In this exemplary embodiment, the adhesive 13 is formed as an expandable adhesive, wherein the adhesive 13 is arranged on the support 11 before expansion. The support 11 with the adhesive 13 is thus inserted into the structural element 12, 14, and then the adhesive 13 is expanded, e.g. by application of heat, so that the expanded adhesive 13' connects the support 11 to the structural element 12, 14.

In alternative embodiments (not shown), the adhesive 13 is not firstly arranged on the support 11 but is applied directly to the inner walls of the structural element 12, 14, or is introduced into the region between the support 13 and the structural element 12, 14 after the support 11 has been arranged in the structural element 12, 14. In such cases, adhesives 13 with different viscosities may be used so that the adhesive 13 is suitable for pumping or extrusion or application.

The device proposed here with the support 11 may in principle be used for different adhesives 13 and for different methods of applying these adhesives 13.

The following figures show various exemplary embodiments of the support 11.

Figure 4A:
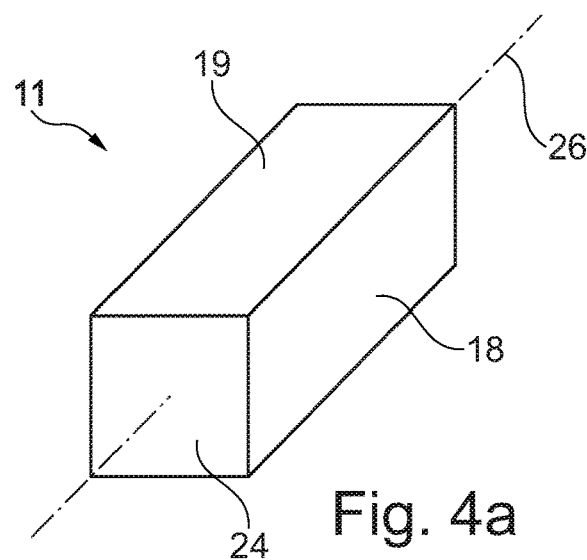
Figure 4B:
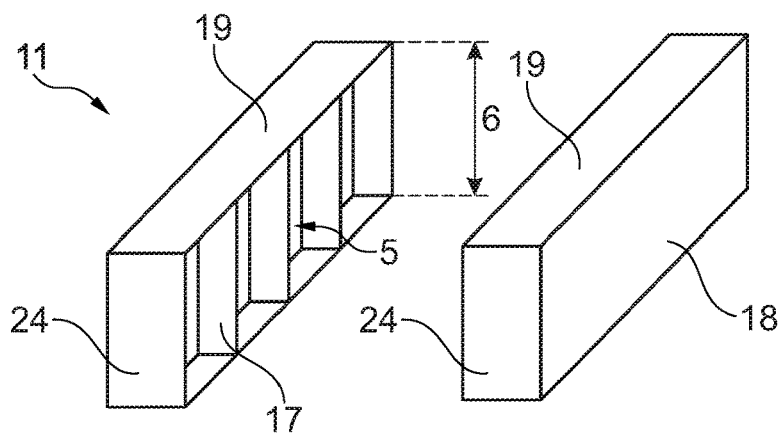
Figure 4C:
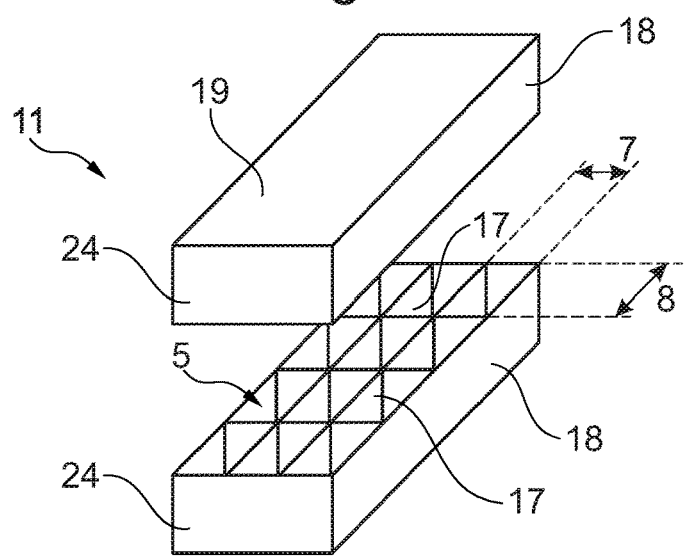

FIGS. 4a to 4c show a cuboid support 11. This support 11 has a longitudinal axis 26, side walls 18, top walls 19, front and rear walls 24, and ribs 17. Walls 18, 19, 24 and ribs 17 form the cells 5. The cells 5 each have a height 6, a width 7 and a length 8. In this exemplary embodiment, the support 11 comprises twelve cells 5 which are arranged in a single layer.

Figure 5A:
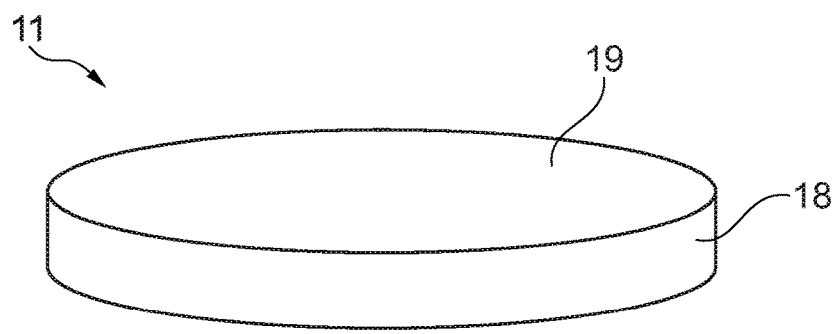
Figure 5B:
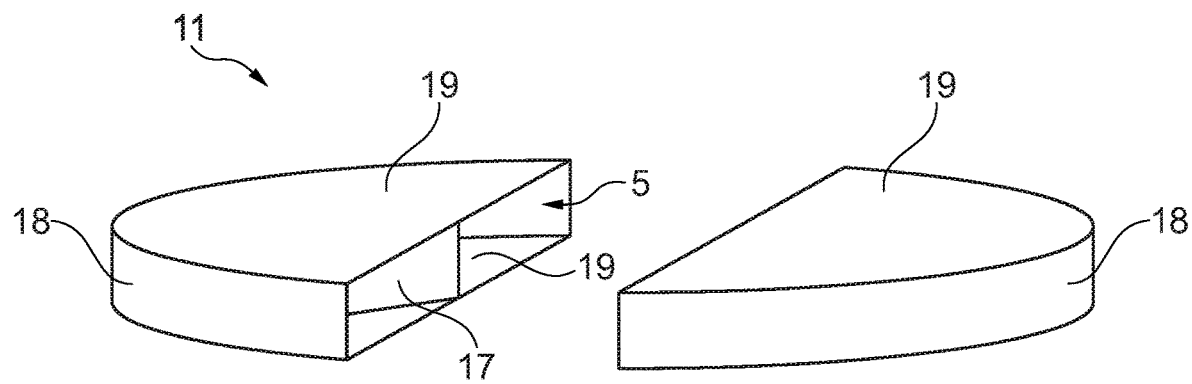
Figure 5C:
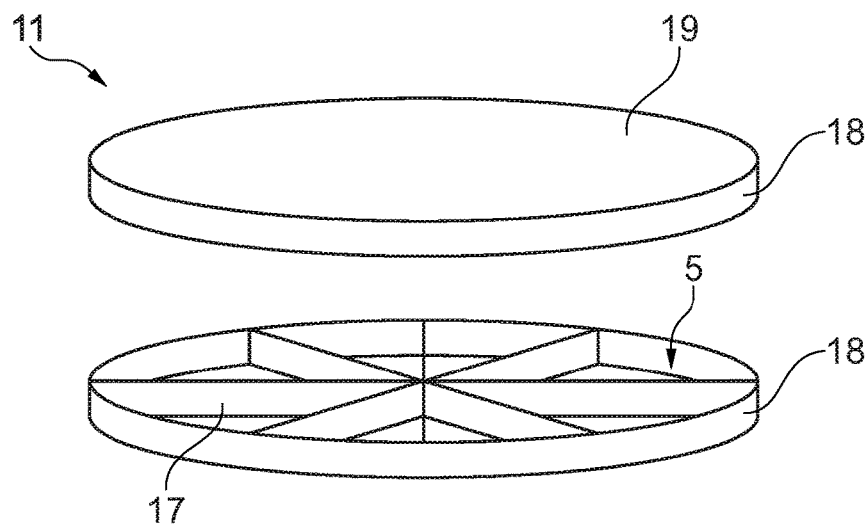

FIGS. 5a to 5c show a further exemplary embodiment of a support 11. The support 11 in this exemplary embodiment has a circular contour. Again, the support 11 has top walls 19, a side wall 18 and ribs 17. In this exemplary embodiment, the cells 5 are configured as sectors, wherein in this exemplary embodiment the support 11 comprises eight such sector-like cells 5 which again are arranged in a single layer.

Figure 6:
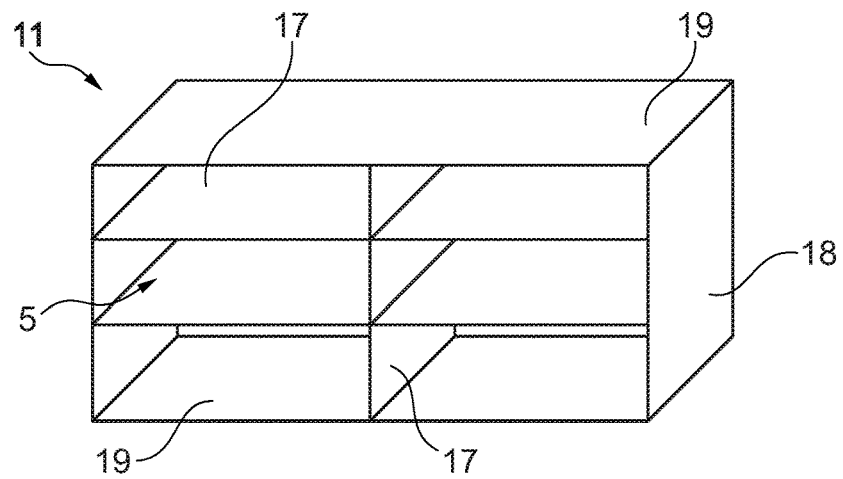

A further exemplary embodiment of a support 11 is illustrated in FIG. 6. In this exemplary embodiment, the cells 5 are arranged in three layers one above the other. Thus there are ribs 17 arranged parallel to the side walls 18, and ribs 17 arranged parallel to the top walls 19.

Figure 7:
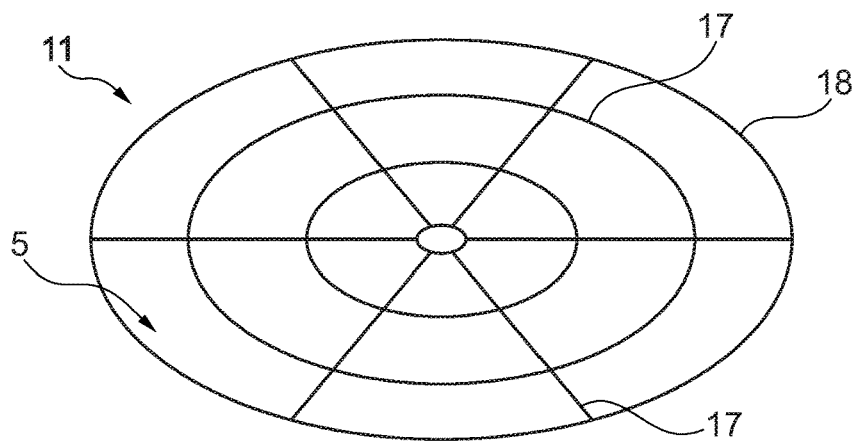

A further exemplary embodiment of a support 11 is illustrated in FIG. 7. In this exemplary embodiment, the support 11 has an oval contour. Again, the cells 5 are configured as sectors, wherein each sector consists of multiple cells 5.

Figure 8:
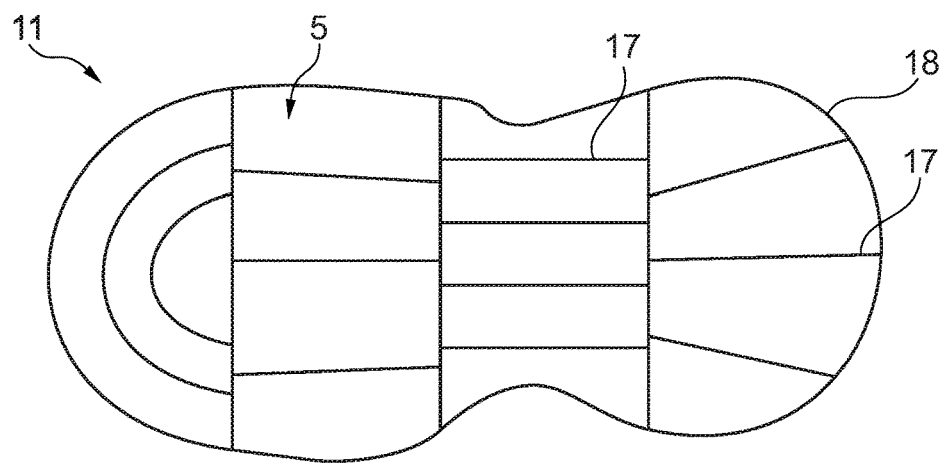

A further exemplary embodiment of a support 11 is illustrated in FIG. 8. In this exemplary embodiment, the support 11 has an irregular contour and also irregularly shaped cells 5. Depending on the requirements or load case for the system 1, smaller and larger cells 5 may be arranged in different configurations so as to provide a weight-optimized support 11 and a support 11 with the highest possible mechanical load-bearing capacity.

Figure 9A:
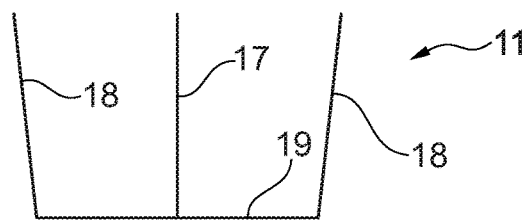
Figure 9B:
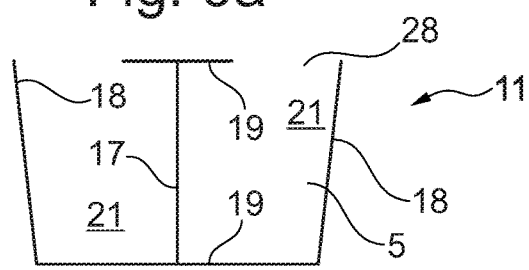
Figure 9C:
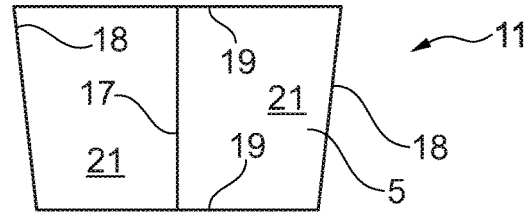

FIGS. 9a to 9c show cross-sections of supports 11. FIG. 9a shows a support 11 according to the prior art. In FIG. 9a, no cavity 21 is delimited by walls 17, 18, 19 in every direction, since the interior of the support 11 is completely open at the top. Thus the support 11 in FIG. 9a comprises no cells in the sense of the invention.

FIG. 9b illustrates an exemplary embodiment of a support 11. Here, the cavities 21 are at least partially delimited by walls 17, 18, 19 in every direction. The top wall 19 has an opening 28. Thus in this exemplary embodiment, the cells 5 are not fully closed.

FIG. 9c shows a further variant of a support 11. In this exemplary embodiment, the cavities 21 are fully delimited by walls 17, 18, 19 in every direction. In this exemplary embodiment, accordingly the cells 5 are fully closed by the walls 17, 18, 19.

Figure 10A:
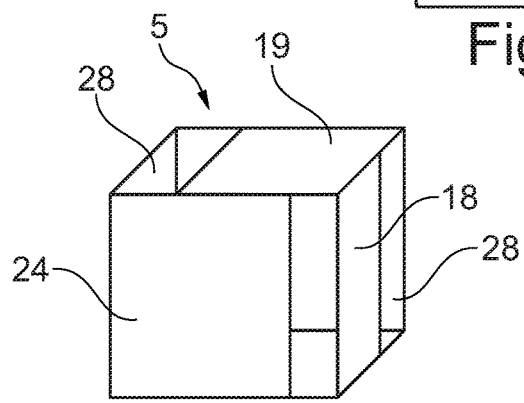
Figure 10B:
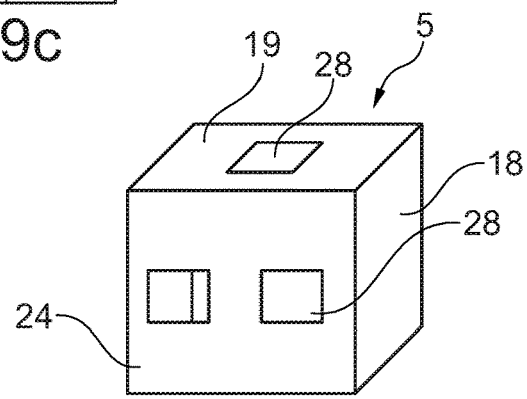
Figure 10C:
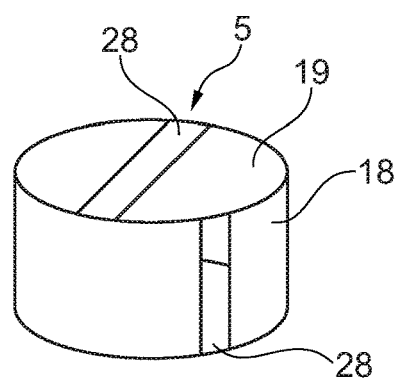
Figure 10D:
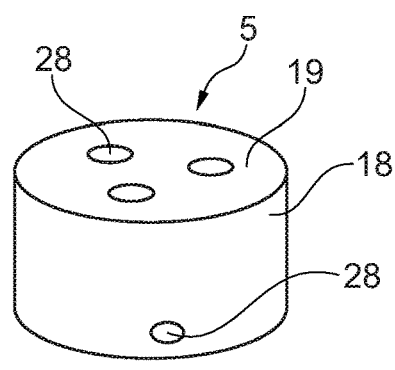

FIGS. 10a to 10d each show individual cells 5 which have different openings 28. FIG. 10a shows a cell 5 which has elongate and rectangular openings 28 in several walls 18, 19, 24. FIG. 10b in turn shows a cell 5 with rectangular openings 28. In this exemplary embodiment, two openings 28 are arranged in one front wall 24. FIG. 10c shows a cylindrical cell 5, wherein this cell 5 has slot-like openings 28 in the walls 18, 19. FIG. 10d in turn shows a cylindrical cell 5 which has round openings in the walls 18, 19.

Figure 11:
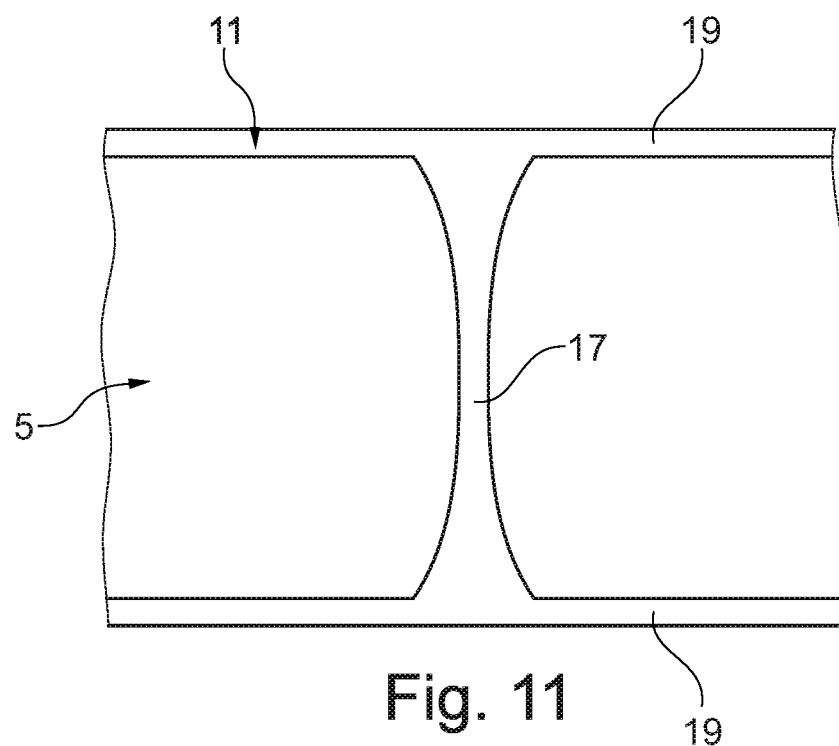
Figure 12:
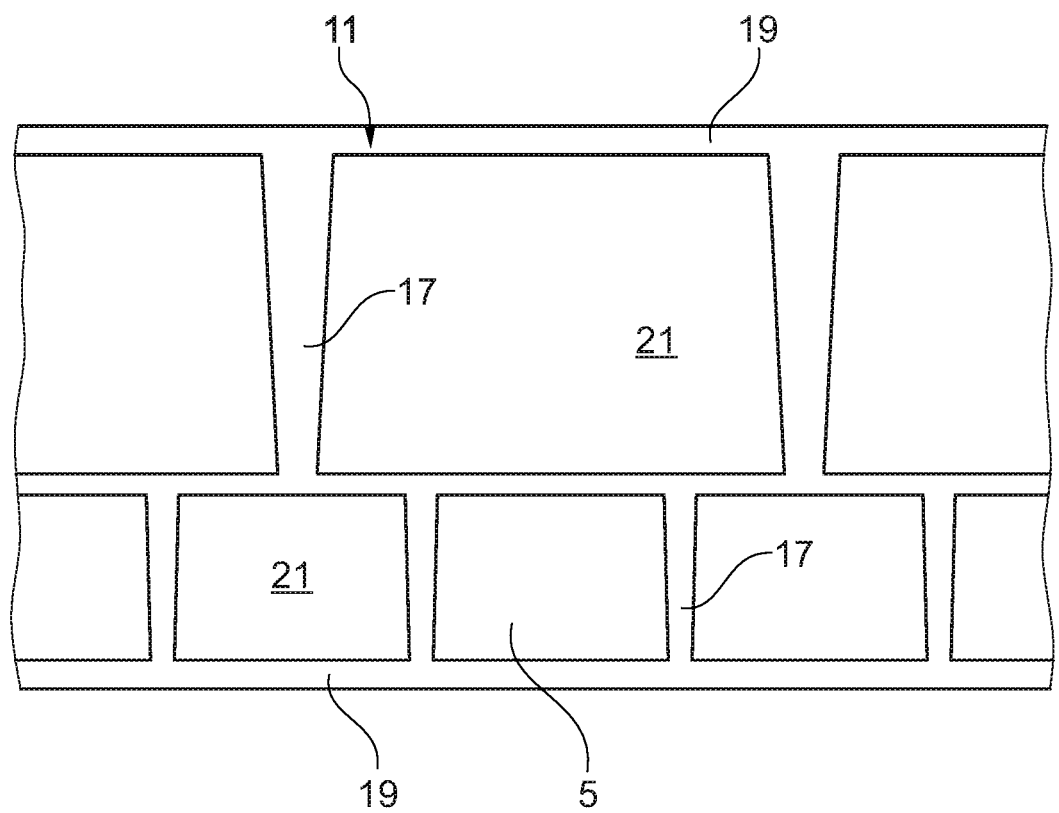

FIGS. 11 and 12 each show cross-sections through a support 11. FIG. 11 illustrates a single-layer support 11, whereas FIG. 12 shows a support 11 with two layers one above the other. It is evident from these cross-sections that the walls 18, 19, 17, 24 of the support 11 may be configured differently with respect to their thickness. FIG. 11 shows for example a rib 17 with a concave cross-section. FIG. 12 shows the ribs 17 with a cross-section tapering in one direction. These and other similar embodiments of the walls 17, 18, 19, 24 allows the provision of weight-optimized supports 11.

LIST OF REFERENCE SIGNS

1 System
5 Cell
6 Cell height
7 Cell width
8 Cell length
10 Body
11 Support
12 Structural element
13 Adhesive
14 Structural element
15 Angle
16 Device
17 Rib
18 Side wall
19 Top wall
21 Cavity
24 Front/rear wall
26 Longitudinal axis of support
28 Opening

The invention claimed is:

1. A device for reinforcing, sealing or damping a structural element in a motor vehicle, the device comprising a support with multiple cells, each cell having multiple walls and a cavity that is surrounded by the multiple walls, each side of the cell being delimited by at least a portion of a wall of the multiple walls,
   wherein each cell has an extension in length, height, and width between 5 mm and 100 mm,
   an outer surface of the support is configured to be connected to the structural element by an adhesive, and
   the multiple walls are integrally formed.

2. The device as claimed in claim 1, wherein the support has at least four cells.

3. The device as claimed in claim 1, wherein the walls of the cells close at least 70% of the outer surface of the support.

4. The device as claimed in claim 1, wherein the cells are arranged in only one layer.

5. The device as claimed in claim 1, wherein an arrangement and form of the cells is based on an estimated load for the device.

6. The device as claimed in claim 1, wherein at least one of (i) the cells have different dimensions and (ii) the cells are irregular in form.

7. The device as claimed in claim 1, wherein a thickness of the walls of the cells is based on an estimated load for the device.

8. The device as claimed in claim 1, wherein a thickness of the walls of the cells is uneven.

9. The device as claimed in claim 1, wherein the cells have openings.

10. The device as claimed in claim 9, wherein the openings are round, oval, rectangular, square or irregular in form.

11. The device as claimed in claim 9, wherein the cells have at least one opening on at least two walls.

12. The device as claimed in claim 11, wherein the openings are arranged in walls which are not adjacent to each other.

13. The device as claimed in claim 1, wherein at least one of (i) the support contains metal, steel, aluminum, magnesium, plastic, fiber-reinforced plastic, organic sheet material, or a combination of the materials, and (ii) all walls of the support are made from the same material.

14. A system of a reinforced, sealed or damped structural element in a motor vehicle, the system comprising:
    a structural element;
    a support as claimed in claim 1, wherein the support is arranged in the structural element; and
    an adhesive,
    wherein the adhesive connects the support and the structural element together.

15. The system as claimed in claim 14, wherein the adhesive is a non-expandable adhesive or an expandable adhesive.

16. A device for reinforcing, sealing or damping a structural element in a motor vehicle, the device comprising a support with multiple cells, each cell being defined by multiple walls disposed on opposing ends of each of a length, height, and width direction, and having a cavity being surrounded by the multiple walls,
    wherein each of the length, height, and width of the cavity extends between 5 mm and 100 mm,
    an outer surface of the support is configured to be connected to the structural element by an adhesive, and
    the multiple walls are integrally formed.

17. A device for reinforcing, sealing or damping a structural element in a motor vehicle, the device comprising a support with multiple cells, each cell being defined by a cavity being surrounded by multiple walls of the cell, the cavity having no side that is not at least partially enclosed by a wall of the multiple walls of the cell,
    wherein each cell has an extension in length, height, and width between 5 mm and 100 mm,
    an outer surface of the support is configured to be connected to the structural element by an adhesive, and
    the multiple walls are integrally formed.

* * * * *